United States Patent [19]

Ralph et al.

[11] Patent Number: 5,021,723
[45] Date of Patent: Jun. 4, 1991

[54] AC MOTOR CONTROL

[76] Inventors: George A. Ralph, 1140 Detwiler Dr.; Charles R. Holtzinger, 417 N. George St., both of York, Pa. 17404

[21] Appl. No.: 505,233

[22] Filed: Apr. 5, 1990

[51] Int. Cl.⁵ .............................................. H02P 3/20
[52] U.S. Cl. ...................................... 318/756; 318/754
[58] Field of Search ............... 318/748, 754, 757, 758, 318/764, 775-777, 689, 739, 756

[56] References Cited

U.S. PATENT DOCUMENTS

| | | | |
|---|---|---|---|
| 1,313,688 | 8/1919 | Henderson | 318/754 |
| 2,519,356 | 8/1950 | Curry, Jr. | 318/748 |
| 2,847,630 | 8/1958 | Holt et al. | 318/757 |
| 4,196,375 | 4/1980 | Findelsen | 318/809 |
| 4,438,382 | 3/1984 | Vucovich et al. | 318/763 |
| 4,695,782 | 9/1987 | Jatnleks | 318/748 |
| 4,712,054 | 12/1987 | Boldt | 318/758 |

Primary Examiner—David Smith, Jr.
Attorney, Agent, or Firm—Daniel J. O'Connor

[57] ABSTRACT

An AC motor control system and process useful in such AC motor applications as elevators, storage retrieval machines, cranes and hoists, and other load-carrying and work performing machinery.

Two identical and electrically isolated windings are utilized in an AC motor with the current to each winding being controlled through an SCR bank. A first winding, when energized, sets up an electromagnetic field which drives the rotor in a clockwise. A second winding, when energized, drives the rotor in a counter-clockwise direction.

The use of two separate motor windings eliminates line-to-line electrical short circuit problems so that expensive lock-out circuits, circuit breakers, current feedback detectors and air chokes are no longer required.

1 Claim, 1 Drawing Sheet

AC MOTOR CONTROL

BACKGROUND OF THE INVENTION

This invention relates generally to an improved control system and process for three-phase AC motors used in such variable speed, load-carrying applications as elevators.

Prior art systems typically use a single winding AC motor system as shown schematically in FIG. 1. Clockwise and counterclockwise SCR banks 3 and 4 control the application of current to the three winding portions T1, T2 and T3 of motor 7.

One problem encountered in such prior are systems has been that of electrical short circuiting between the clockwise and counterclockwise SCR banks. If, for example, the C-phase of the clockwise SCR bank is energized at the same time as the B-phase of the counterclockwise SCR bank, as shown at numeral 5 of FIG. 1, a dangerous and potentially damaging short circuit condition occurs.

In order to avoid this condition, prior art systems have used a complex control panel 8 upstream of the SCR banks. The control panel typically has such items as rapid circuit breakers, phase sequence detectors, lock-out circuits, air chokes and current feedback devices to avoid and/or prevent damage from a line-to-line electrical short condition. Such systems are not only initially expensive but also require an inordinate amount of repair and maintenance costs.

Typically, such systems further require extensive use of an external mechanical brake when the load must be stopped or floated at an intermediate point of travel.

It is an object of the present invention to eliminate the need for such costly, complex and dangerous prior art systems by the use of two separate AC motor windings which are controlled in a novel manner as compared to known plural winding designs.

PRIOR ART PATENTS

The broad concept of multiple winding use is illustrated in the prior art by the following patents:
U.S. Pat. No. 4,381,482 issued to Doniwa;
U.S. Pat. No 4,463,302 issued to Kirschbaum;
U.S. Pat. No. 3,528,103 issued to Wolf.

As will be apparent from the description which follows, the present invention sets forth novel control features which have not heretofore been taught in the prior art.

SUMMARY OF THE INVENTION

In the present system, many of the above costly problems in the art are avoided via the use of two separate and electrically isolated windings in an AC motor. See FIG. 2.

A first winding having portions T1, T2 and T3 is energized by an SCR bank in such manner as to cause clockwise rotation of the rotor. A second winding having portions T11, T12 and T13 is energized by a second SCR bank to cause counterclockwise rotation of the rotor.

With such a system, the possibility of line-to-line electrical shorting is eliminated. Thus, the costly control panel components, i.e. lock-out circuits, air chokes and phase sequence detectors, are no longer required. In addition, since both windings may be energized at the same time, a full torque-zero speed condition is obtained which eliminates the need for mechanical brake wear in the system. In the present system, there always exists a motor torque even at or near zero speed. A more efficient acceleration and deceleration of a load is thus achieved without the load-jarring effect encountered with the application of a mechanical brake.

BRIEF DESCRIPTION OF THE DRAWING FIGURES

FULL DESCRIPTION OF THE PREFERRED EMBODIMENT

Figure 1:
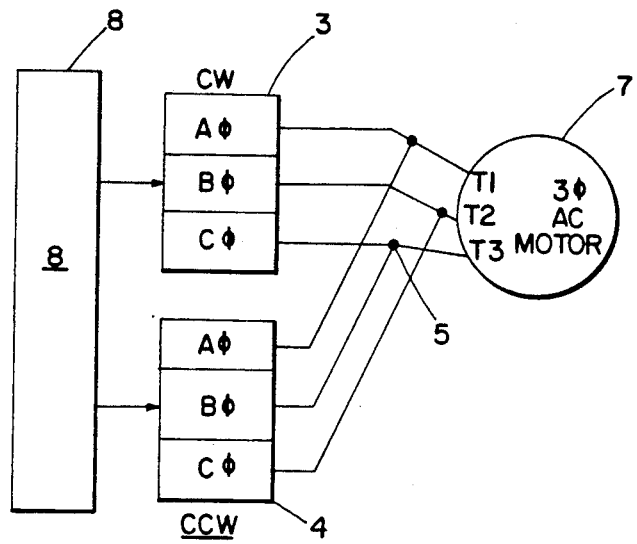
FIG. 1 shows, in schematic form, a typical prior art single winding system which requires the corresponding control panel components to prevent line-to-line electrical short conditions.

The prior art system of FIG. 1, as previously described, requires complex control panel components for the single winding AC motor to prevent line-to-line electrical short circuiting. In addition, a load-jarring and costly mechanical brake is required to stop a load in a desired position.

Figure 2:
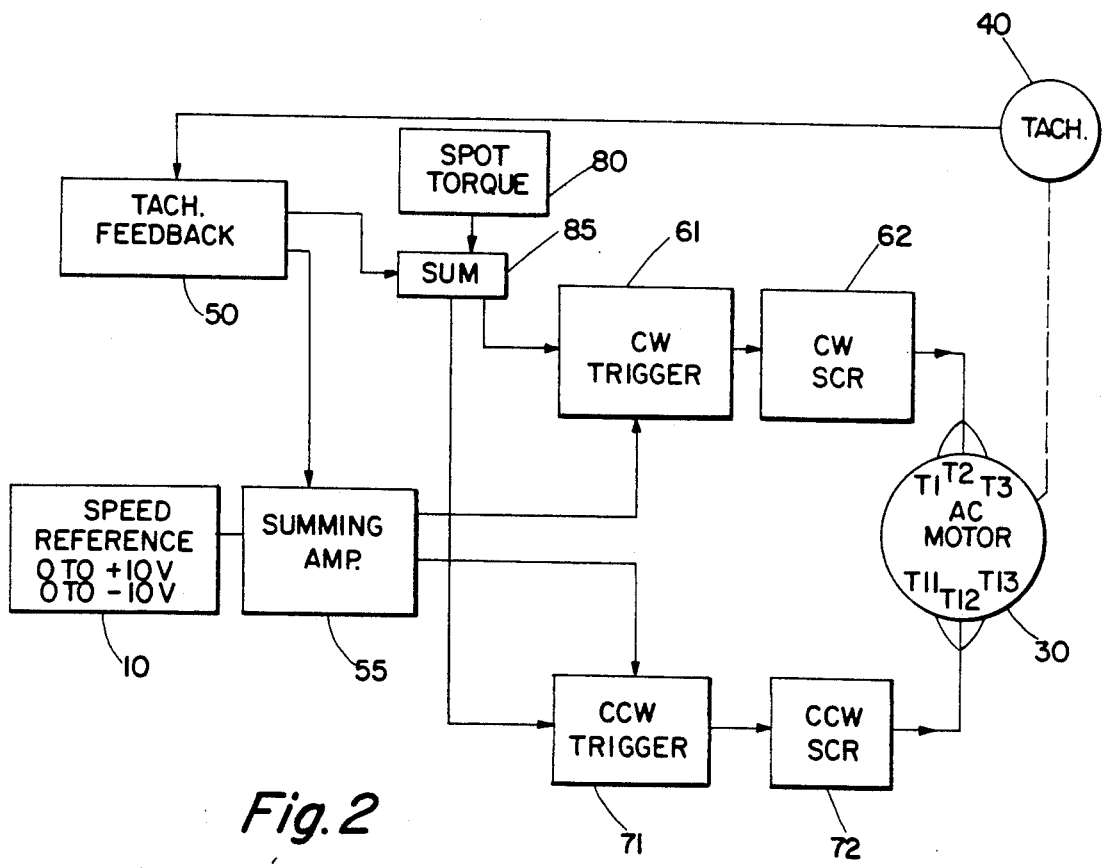
FIG. 2 illustrates the control system of the present invention in logic/block diagram form.

Referring now to the present invention system of FIG. 2, there is indicated at 30 a three-phase induction AC motor having a rating of 230, 460 or 575 volts.

The AC motor 30 had two separate mechanically and electrically isolated windings located therein. A first winding, to generate clockwise rotation of a rotor, is shown as having winding portions T1, T2 and T3. A second winding, to generate counterclockwise rotation of a rotor, is shown as having winding portions T11, T12 and T13.

Tachometer 40 measures motor speed and generates a signal to the tachometer feedback station 50.

Existing motor speed is thus read in to a summing amplifier 55 as is the desired motor speed level from the speed reference controls indicated at 10. In testing of the invention system, plural speed selecting potentiometers connected in parallel and having switching elements were utilized to generate a DC reference signal from zero to plus or minus 10 volts depending on the motor speed and direction of rotation desired. Such testing speed selecting potentiometers are known in the art and do not specifically form a part of the invention herein. It is noted that many types of reference speed signaling devices may be effectively used in the system of the present invention.

Summing amplifier 55, receiving DC signals indicative of existing motor speed from circuitry 50 and of desired motor speed from circuitry 10, thus acts as a logic comparator of a type known in the prior art.

Output from the summing amplifier 55 is used to control triggers for SCR circuitry for both clockwise and counterclockwise motor speed control. As shown in the schematic illustration of FIG. 2, trigger 61 controls the clockwise SCR bank 62 to supply a desired voltage and current to the first motor winding denominated as T1, T2, T3. Trigger 71 controls the counterclockwise SCR bank 72 to supply a desired voltage and current to the second motor winding denominated as T11, T12, T13.

In order to appreciate the highly beneficial results of the present system, assume a tachometer reading of 1000 RPM and a desired speed reference of 800 RPM. The appropriate DC signals are fed into the summing amplifier 55 from circuits 50 and 10. To accomplish the desired motor slowing to 800 RPM, power to the first winding T1, T2, T3 is cut off while an appropriate voltage/current level is supplied to the second winding T11, T12, T13 to brake or slow the motor rotation.

When the new desired speed of 800 RPM is reached, summing amplifier 55 acts to cut off power to the second winding and to resume an appropriate voltage-current level to the first or clockwise driving winding.

To stop the motor, a zero RPM level would be read into the speed reference 10 and power to the first winding would be cut off while braking voltage would be supplied to the second counterclockwise winding.

As the motor slows to very near zero RPM, a spot torque signal 80 is activated in the system causing both windings to be activated simultaneously. As shown schematically, the spot torque signal 80 acts through a second summing amplifier 85. This technique allows a load to be electrically braked or floated in a stopped position without the need for excessive wear on a separate mechanical brake as required in prior art systems.

It is again emphasized that the two independent winding design allows both clockwise and counter-clockwise power to be applied simultaneously for the important load floating function without the need for expensive control panel lock-out or phase adjusting systems.

The system described herein also results in the beneficial advantages of higher deceleration rates with less brake wear, accurate load positioning without the need for repositioning, the production of full motor torque at zero speed and greatly enhanced system servicibility by reason of the simplified control system utilized.

It is anticipated that the system of the present invention will find widespread use in the field of load carrying AC variable voltage reversing motors.

It is intended within this specification to cover all changes and modifications to the system which fall within the true spirit and hope of the invention.

We claim:

1. An AC motor and motor control system comprising:
    an AC motor (30) having first and second separate, electrically isolated windings,
    wherein said first winding has three winding portions (T1, T2, T3) located therein to generate clockwise rotation of a rotor,
    wherein said second winding has three winding portions (T11, T12, T13) located therein to generate counterclockwise rotation of a rotor,
    means (40) to measure motor speed and to generate a first signal sent to a feedback station (50),
    speed reference control means (10) for generating a second signal indicative of desired motor speed,
    first summing means (55) for receiving said first signal and said second signal and for comparing said signals,
    wherein said first summing means (55) controls a clockwise trigger (61) and associated clockwise SCR bank (62) to supply a desired voltage and current to said clockwise winding portions (T1, T2, T3)
    wherein said first summing means (55) further controls a counter-clockwise trigger (71) and associated clockwise SCR bank (72) to supply a desired voltage and current to said counter-clockwise winding portions (T11, T12, T13),
    means wherein said AC motor (30) is controlled without the need for mechanical braking elements or lock-out systems,
    a second summing means (85) for receipt of a spot torque signal (80) as the motor (30) slows to near zero, RPM,
    said second summing means (85) also receiving a signal from said feedback station (50),
    wherein said second summing means (85) is connected to said clockwise trigger (61) and associated SCR bank (62),
    wherein said second summing means (85) is further connected in parallel to said counter-clockwise trigger (71) and associated SCR bank (72),
    means wherein said clockwise winding portions (T1, T2, T3) and said counter-clockwise winding portions are activated simultaneously via said second summing means (85),
    wherein said first summing means (55) receives a DC signal from said feedback station (50) indicative of existing motor (30) speed and a DC signal indicative of desired motor speed from said speed reference control means (10),
    wherein said means (40) to measure motor speed and to generate a signal sent to a feedback station (50) comprises a tachometer,
    wherein said first summing means (55) for receiving and comparing said signals comprises a summing amplifier,
    wherein said second summing means (85) comprises a summing amplifier,
    wherein said feedback station (50) comprises a tachometer feedback station means for receiving a signal from said tachometer and for generating a DC signal indicating motor speed to be fed to said first summing means (55).

* * * * *